US010777027B2

(12) United States Patent
Oda et al.

(10) Patent No.: US 10,777,027 B2
(45) Date of Patent: Sep. 15, 2020

(54) WORKING VEHICLE, REMOTE DIAGNOSIS SYSTEM, AND REMOTE DIAGNOSIS METHOD

(71) Applicant: Komatsu Ltd., Tokyo (JP)

(72) Inventors: Yuichi Oda, Tokyo (JP); Kousuke Kurinami, Tokyo (JP)

(73) Assignee: KOMATSU LTD., Tokyo (JP)

( * ) Notice: Subject to any disclaimer, the term of this patent is extended or adjusted under 35 U.S.C. 154(b) by 186 days.

(21) Appl. No.: 15/504,744

(22) PCT Filed: Jul. 15, 2016

(86) PCT No.: PCT/JP2016/071089
§ 371 (c)(1),
(2) Date: Feb. 17, 2017

(87) PCT Pub. No.: WO2018/011999
PCT Pub. Date: Jan. 18, 2018

(65) Prior Publication Data
US 2018/0225895 A1    Aug. 9, 2018

(51) Int. Cl.
G07C 5/08 (2006.01)
G07C 5/00 (2006.01)
H04L 29/08 (2006.01)
H04W 4/44 (2018.01)
H04N 7/18 (2006.01)

(52) U.S. Cl.
CPC ........... G07C 5/0808 (2013.01); G07C 5/008 (2013.01); G07C 5/0825 (2013.01); H04L 67/12 (2013.01); H04N 7/181 (2013.01); H04W 4/44 (2018.02); G05D 2201/0202 (2013.01)

(58) Field of Classification Search
CPC .... G07C 5/0808; G07C 5/0825; G07C 5/008; H04W 4/44; H04L 67/12; H04L 67/02; G05D 2201/0202; H04N 7/181
See application file for complete search history.

(56) References Cited

U.S. PATENT DOCUMENTS 4,476,531 A * 10/1984 Marino ................... F02P 17/08
                                                324/379
6,633,800 B1    10/2003 Ward et al.
8,972,099 B2 *  3/2015 Ghoneim ........... G05B 23/0254
                                                701/31.4
(Continued)

FOREIGN PATENT DOCUMENTS

CA    2923679 A1 *  3/2015 ......... B60C 23/0479
CN    101331389 A    12/2008
(Continued)

OTHER PUBLICATIONS

International Search Report dated Sep. 6, 2016, issued for PCT/JP2016/071089.
(Continued)

Primary Examiner — Peter D Nolan
(74) Attorney, Agent, or Firm — Locke Lord LLP

(57) ABSTRACT

A working vehicle includes an acquisition device that acquires operating state data, a client screen data generation unit that generates client screen data that a client display device of a client apparatus can display based on the operating state data, and a wireless communication device that transmits the client screen data to the client apparatus.

11 Claims, 9 Drawing Sheets

(56) References Cited

U.S. PATENT DOCUMENTS

| | | | |
|---|---|---|---|
| 9,201,842 B2* | 12/2015 | Plante | G07C 5/008 |
| 9,256,852 B1* | 2/2016 | Myllymaki | G06Q 10/083 |
| 9,672,665 B1* | 6/2017 | Kraft | G07C 5/006 |
| 9,704,302 B2 | 7/2017 | Yamagata et al. | |
| 10,142,420 B2* | 11/2018 | Lei | B60L 58/12 |
| 2006/0106508 A1* | 5/2006 | Liebl | G07C 5/008 |
| | | | 701/31.4 |
| 2007/0011227 A1 | 1/2007 | Johnson | |
| 2007/0100520 A1* | 5/2007 | Shah | G07C 5/008 |
| | | | 701/31.4 |
| 2008/0119981 A1* | 5/2008 | Chen | G05B 23/0267 |
| | | | 701/31.4 |
| 2008/0266254 A1 | 10/2008 | Robbins et al. | |
| 2010/0161175 A1* | 6/2010 | Yamada | E02F 9/26 |
| | | | 701/33.4 |
| 2012/0041637 A1* | 2/2012 | Allemang | G07C 5/008 |
| | | | 701/31.5 |
| 2013/0006484 A1* | 1/2013 | Avitzur | E02F 9/205 |
| | | | 701/50 |
| 2013/0138265 A1* | 5/2013 | Kim | B60K 37/00 |
| | | | 701/1 |
| 2014/0100738 A1* | 4/2014 | Itatsu | G07C 5/0808 |
| | | | 701/33.4 |
| 2014/0222281 A1* | 8/2014 | Ghoneim | G06F 17/00 |
| | | | 701/31.4 |
| 2015/0082176 A1* | 3/2015 | Khawer | G06F 3/0484 |
| | | | 715/733 |
| 2015/0274062 A1* | 10/2015 | Wen | B60K 31/18 |
| | | | 348/77 |
| 2016/0112216 A1* | 4/2016 | Sargent | H04L 12/66 |
| | | | 370/328 |
| 2016/0202351 A1* | 7/2016 | Uotsu | G01S 13/04 |
| | | | 342/27 |
| 2016/0217628 A1* | 7/2016 | Ghoneim | G05B 23/0245 |
| 2016/0364398 A1* | 12/2016 | Nelson | G06F 17/212 |
| 2017/0063994 A1* | 3/2017 | Lei | B60L 58/12 |
| 2017/0168501 A1* | 6/2017 | Ogura | G05D 1/0278 |
| 2017/0325443 A1* | 11/2017 | Crinklaw | A01M 7/0014 |
| 2018/0136651 A1* | 5/2018 | Levinson | G05D 1/0044 |

FOREIGN PATENT DOCUMENTS

| | | |
|---|---|---|
| JP | 11-161322 A | 6/1999 |
| JP | 11-286971 A | 10/1999 |
| JP | 2001-125637 A | 5/2001 |
| JP | 2007-186289 A | 7/2007 |
| JP | 2009-501968 A | 1/2009 |
| JP | 2010-198158 A | 9/2010 |
| JP | 2015-171256 A | 9/2015 |
| WO | 2014/045397 A1 | 3/2014 |

OTHER PUBLICATIONS

Office Action dated Dec. 14, 2017, issued for the Canadian patent application No. 2,957,649.

Office Action dated Oct. 9, 2018, issued for the Canadian patent application No. 2,957,649.

Canadian Office Action dated Jun. 19, 2019 in the corresponding Canadian patent application No. 2957649.

* cited by examiner

WORKING VEHICLE, REMOTE DIAGNOSIS SYSTEM, AND REMOTE DIAGNOSIS METHOD

FIELD

The present invention relates to a working vehicle, a remote diagnosis system, and a remote diagnosis method.

BACKGROUND

A technique of checking an operating state of a working vehicle at a remote site is known. A technique in which an apparatus such as, for example, a camera or a sensor is provided in a working vehicle as an acquisition device capable of acquiring operating state data of the working vehicle, and the operating state data acquired by the acquisition device is transmitted to a remote site by a wireless communication device is known. Diagnosis and prediction of failures of the working vehicle, maintenance planning of the working vehicle, and the like are performed by acquiring or analyzing the operating state data.

CITATION LIST

Patent Literature

Patent Literature 1: JP 2010-198158 A

SUMMARY

Technical Problem

When the operating state data acquired by the acquisition device has a large volume and is transmitted to the remote site by the wireless communication device, delay and interruption of communication may occur. Since a number of sensors or multiple types of sensors are attached to the working vehicle, the data detected by the sensors has a large volume. Moreover, when it is desired to check the operating state of the working vehicle in real time using the data detected by the sensors, the data output from the sensors needs at a sampling cycle as short as possible. Therefore, the data detected by the sensors has a large volume. As described above, since there are a number of types or a number of sensors and the sampling cycle of the data output by the sensors is short, when delay and interruption of communication occurs due to this, it is difficult to check the operating state of the working vehicle at a remote site in real time.

An object of an aspect of the present invention is to provide a working vehicle, a remote diagnosis system, and a remote diagnosis method capable of smoothly checking the operating state of a working vehicle without impairing a real-time property when the working vehicle operates at a remote site.

Solution to Problem

According to a first aspect of the present invention, a working vehicle includes: an acquisition device that acquires operating state data; a client screen data generation unit that generates client screen data that a client display device of a client apparatus can display based on the operating state data; and a wireless communication device that transmits the client screen data to the client apparatus.

According to a second aspect of the present invention, a remote diagnosis system comprises: a client screen data acquisition unit that acquires client screen data generated based on operating state data of a working vehicle from a server apparatus of the working vehicle via a communication line; and a display control unit that causes a client display device of a client apparatus to display the client screen data.

According to a third aspect of the present invention, a remote diagnosis method comprises: acquiring operating state data of a working vehicle; generating client screen data based on the operating state data; transmitting the client screen data from a server apparatus of the working vehicle to a client apparatus via a communication line; and causing a client display device of the client apparatus to display the client screen data.

Advantageous Effects of Invention

According to the present invention, a working vehicle, a remote diagnosis system, and a remote diagnosis method capable of smoothly checking the operating state of a working vehicle without impairing a real-time property when the working vehicle operates at a remote site are provided.

DESCRIPTION OF EMBODIMENTS

While embodiments of the present invention will be described with reference to the drawings, the present invention is not limited to these embodiments. The constituent elements of respective embodiments described later can be appropriately combined with each other. Moreover, some of the constituent elements may not be used.

First Embodiment (Overview of Remote Diagnosis System)

Figure 1:
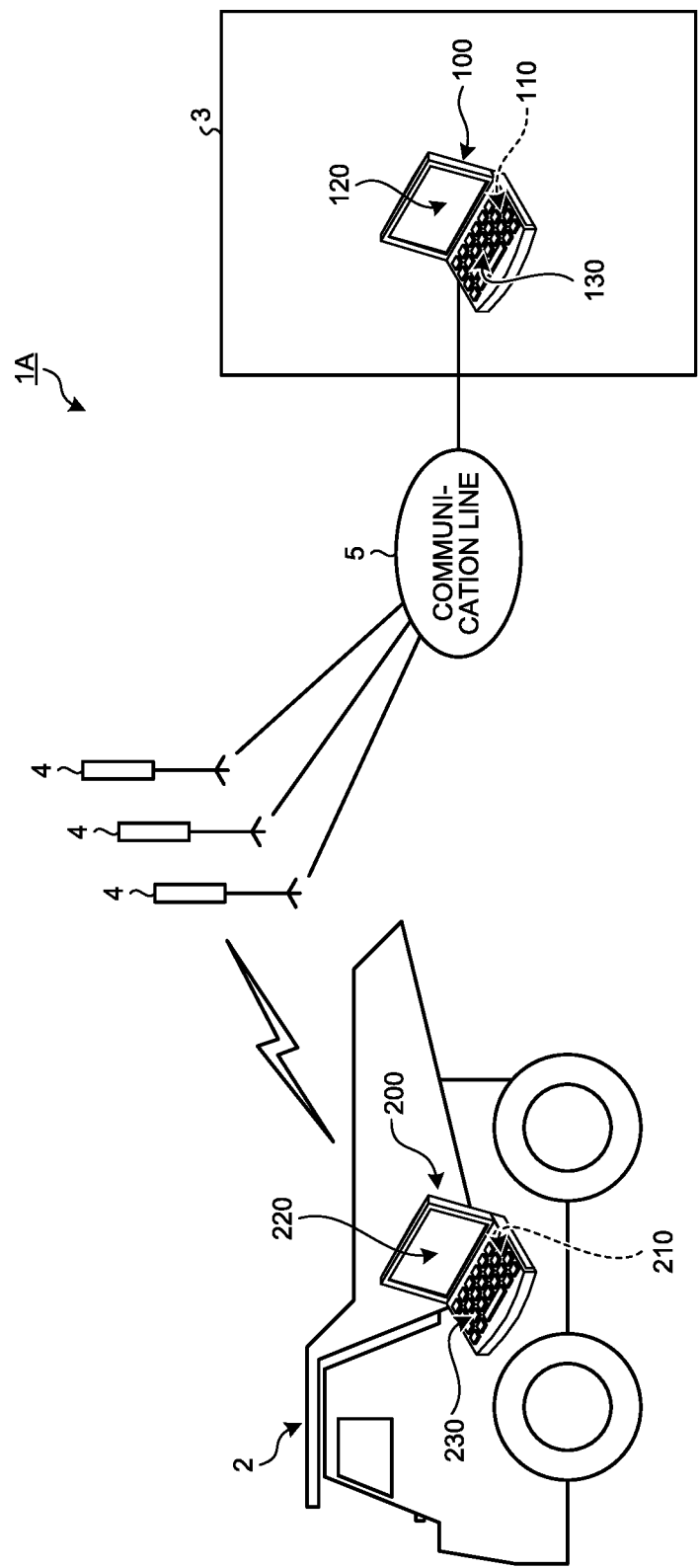
FIG. 1 is a diagram schematically illustrating an example of a remote diagnosis system according to a first embodiment.

A first embodiment will be described. FIG. 1 is a diagram schematically illustrating an example of a remote diagnosis system 1A according to the present embodiment. As illustrated in FIG. 1, the remote diagnosis system 1A includes a client apparatus 100 for checking an operating state of a working vehicle 2 at a remote site. The client apparatus 100 is provided in a management facility 3. In the present embodiment, the working vehicle 2 at the remote site indicates a working vehicle 2 that operates at a place distant from the management facility 3, and the distance between the management facility 3 and the working vehicle 2 is not particularly limited. Thus, the remote site includes a case in which the working vehicle 2 is visible from the management facility 3 and a case in which the working vehicle 2 is invisible from the management facility 3. The client apparatus 100 can communicate with a server apparatus 200 mounted on the working vehicle 2 via an antenna 4 and a communication line 5. The antenna 4 is a portable antenna and functions as a relay station of wireless communication. The communication line 5 includes a wireless local area network (LAN). The communication line 5 may include at least one of a cellular network and the Internet.

The client apparatus 100 includes a computer system such as a personal computer. The client apparatus 100 includes a client data processor 110, a client display device 120, and a client input device 130. The client data processor 110 includes a processor such as a central processing unit (CPU), a storage device including a nonvolatile memory such as a read only memory (ROM) or a volatile memory such as a random access memory (RAM), and an input and output interface device. The client display device 120 includes a flat panel display such as a liquid crystal display (LCD) or an organic electroluminescence display (OELD). The client input device 130 includes at least one of a computer keyboard, a mouse, and a touch sensor provided on a display screen of the client display device 120.

The server apparatus 200 includes a computer system such as a personal computer. The server apparatus 200 includes a server data processor 210, a server display device 220, and a server input device 230. The server data processor 210 includes a processor such as a CPU, a storage device including a nonvolatile memory such as a ROM and a volatile memory such as a RAM, and an input and output interface device. The server display device 220 includes a flat panel display such as a liquid crystal display or an organic EL display. The server input device 230 includes at least one of a computer keyboard, a mouse, and a touch sensor provided in a display screen of the server display device 220. The server data processor 210, the server display device 220, and the server input device 230 may be an integrated device or may be individual devices. Moreover, the server apparatus 200 may not include the server display device 220.

The client apparatus 100 can remotely access the server apparatus 200 via the antenna 4 and the communication line 5. Remote access is a technique of connecting to the server apparatus 200 at a remote site via a network and using the data possessed by the server apparatus 200 from the remote site. Screen data substantially the same as the screen data displayed on the display screen of the server display device 220 of the server apparatus 200 is displayed on the display screen of the client display device 120 of the client apparatus 100. Moreover, an administrator can operate the client input device 130 of the client apparatus 100 to remotely operate the server apparatus 200.

In the present embodiment, an absolute position of the working vehicle 2 is detected using a global navigation satellite system (GNSS). GNSS refers to a global navigation satellite system. An example of the global navigation satellite system is a global positioning system (GPS). The GNSS has a plurality of positioning satellites. The GNSS detects a position defined by coordinate data of latitude, longitude, and altitude. The position detected by the GNSS is an absolute position defined in a global coordinate system. The absolute position of the working vehicle 2 is detected by the GNSS.

(Working Vehicle)

Figure 2:
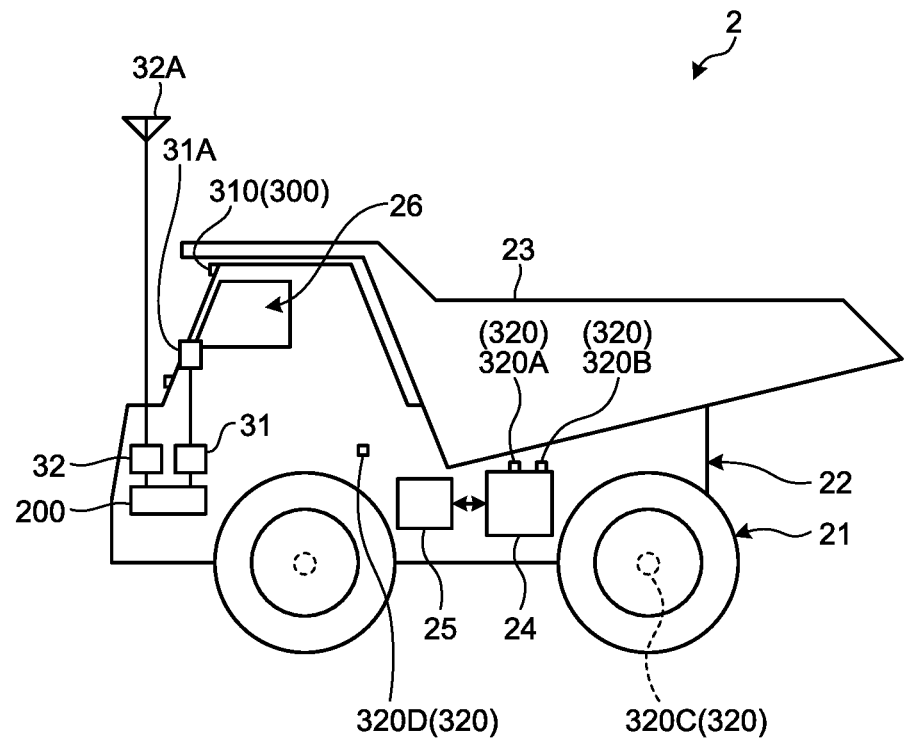
FIG. 2 is a side view schematically illustrating an example of a working vehicle according to the first embodiment.
Figure 3:
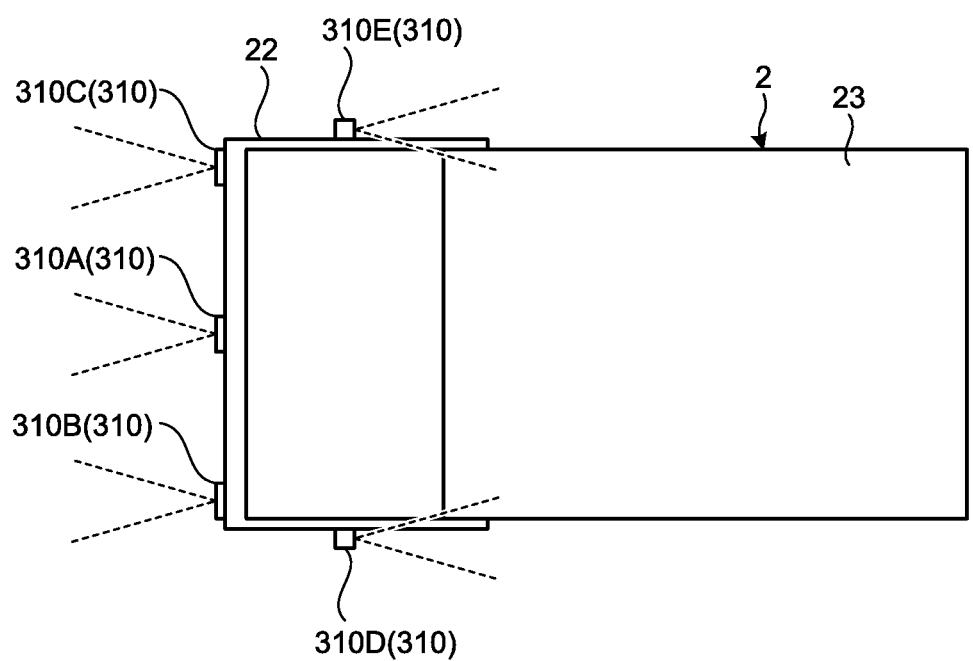
FIG. 3 is a plan view schematically illustrating an example of a working vehicle according to the first embodiment.

Next, the working vehicle 2 will be described. FIG. 2 is a side view schematically illustrating an example of the working vehicle 2 according to the present embodiment. FIG. 3 is a plan view schematically illustrating an example of the working vehicle 2 according to the present embodiment. In the present embodiment, the working vehicle 2 is a dump truck which is a type of a delivery vehicle. In the following description, the working vehicle 2 will be appropriately referred to as a dump truck 2. In the present embodiment, the dump truck 2 is a manned dump truck that travels by an operation of a driver boarding on the dump truck 2.

The dump truck 2 includes a traveling device 21, a vehicle body 22 supported on the traveling device 21, a vessel 23 supported on the vehicle body 22, a driving device 24 that drives the traveling device 21, a control device 25, a position calculation unit 31 that calculates the absolute position of the dump truck 2, a wireless communication device 32, the server apparatus 200, and an acquisition device 300 that acquires the operating state data of the dump truck 2.

The traveling device 21 includes vehicle wheels, a brake device, and a steering device. The traveling device 21 operates with the driving force generated by the driving device 24. The driving device 24 generates driving force for accelerating the dump truck 2. The driving device 24 drives the traveling device 21 according to an electric driving system, for example. The driving device 24 includes an internal combustion engine such as a diesel engine, a generator that operates with the power of the internal combustion engine, and a motor that operates with the electric power generated by the generator to rotate the vehicle wheels.

A cab 26 on which the driver of the dump truck 2 boards is provided in the vehicle body 22. A steering wheel for operating a steering device, an accelerator pedal for adjusting the output of the driving device 24, a brake pedal for operating a brake device, and the like are provided in the cab 26.

The position calculation unit 31 includes a GPS receiver and calculates the absolute position of the dump truck 2. The position calculation unit 31 includes a GPS antenna 31A. The antenna 31A receives radio waves from positioning satellites. The position calculation unit 31 converts the radio wave signals from the positioning satellites received by the antenna 31A to electrical signals to calculate the absolute position of the antenna 31A. When the absolute position of the antenna 31A is calculated, the absolute position of the dump truck 2 is calculated.

The wireless communication device 32 includes an antenna 32A. The wireless communication device 32 can wirelessly communicate with the client apparatus 100.

The acquisition device 300 acquires the operating state data indicating the operating state of the dump truck 2. In the present embodiment, the acquisition device 300 includes a camera 310 that acquires image data and a state quantity sensor 320 that detects the state of the dump truck 2. The acquisition device 300 may include the position calculation unit 31 that calculates the absolute position of the dump truck 2.

The camera 310 acquires at least one of image data around the dump truck 2 and image data of the inside of the cab 26 of the dump truck 2 as the operating state data of the dump truck 2. The camera 310 acquires image data of at least the front side of the dump truck 2.

In the present embodiment, for example, six cameras 310 are provided in the dump truck 2. Among the six cameras 310, a first camera 310A is provided in a central portion of the front part of the vehicle body 22, a second camera 310B is provided in a left portion of the front part of the vehicle body 22, and a third camera 310C is provided in a right portion of the front part of the vehicle body 22. The cameras 310A, 310B, and 310C acquire the image data of the front side of the dump truck 2.

Among the six cameras 310, a fourth camera 310D is provided on a left side of the vehicle body 22, and a fifth camera 310E is provided on a right side of the vehicle body 22. The cameras 310D and 310E acquire the image data of the lateral sides and the backward side of the dump truck 2.

Figure 4:
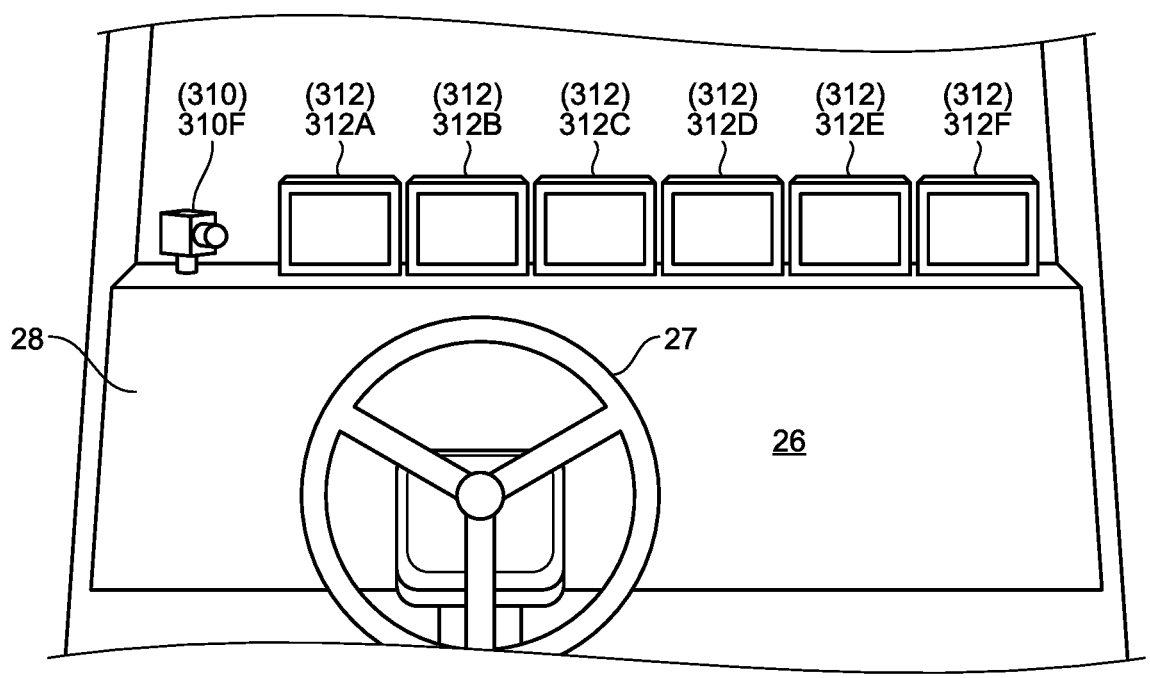
FIG. 4 is a diagram schematically illustrating an example of a cab of the working vehicle according to the first embodiment.

FIG. 4 is a diagram schematically illustrating an example of the cab 26 of the dump truck 2 according to the present embodiment. As illustrated in FIG. 4, a steering wheel 27 is provided in the cab 26. Moreover, among the six cameras 310, a sixth camera 310F is provided in the cab 26. The camera 310F is provided on a dashboard 28 to acquire the image data of the cab 26 which is the inside of the dump truck 2. Moreover, the camera 310F acquires the image data of a driver boarding on the cab 26.

As illustrated in FIG. 4, a monitor device 312 on which the image data acquired by the camera 310 is displayed is disposed in the cab 26. The monitor device 312 includes a first monitor device 312A that displays the image data acquired by the first camera 310A, a second monitor device 312B that displays the image data acquired by the second camera 310B, a third monitor device 312C that displays the image data acquired by the third camera 310C, a fourth monitor device 312D that displays the image data acquired by the fourth camera 310D, a fifth monitor device 312E that displays the image data acquired by the fifth camera 310E, and a sixth monitor device 312F that displays the image data acquired by the sixth camera 310F.

In the present embodiment, the camera 310 has a video camera function capable of acquiring video data. The video data acquired by the camera 310 is displayed on the monitor device 312 in real time. In the present embodiment, the image data includes video data and still image data.

The installation position of the camera 310 may be changed appropriately as well as the image data around the dump truck 2 and the image data of the inside of the cab 26 of the dump truck 2. For example, the camera 310 may acquire the image data of at least a portion of the traveling device 21 and may acquire the image data of at least a portion of the vehicle body 22. Moreover, the number of cameras 310 is not limited to six but may be an arbitrary number.

The state quantity sensor 320 detects state quantity data indicating the state of the dump truck 2 as the operating state data of the dump truck 2. As illustrated in FIG. 2, in the present embodiment, the state quantity sensor 320 includes an engine speed sensor 320A that detects an engine speed per unit time of a diesel engine which is the driving device 24, for example, an engine temperature sensor 320B that detects the temperature of a coolant of the diesel engine, a speed sensor 320C that detects a traveling speed of the traveling device 21, and a vibration sensor 320D that detects an acceleration indicating a vibration occurring in the dump truck 2.

The state quantity of the dump truck 2 detected by the state quantity sensor 320 is not limited to the engine speed per unit time of the diesel engine, the temperature of the diesel engine, the traveling speed of the traveling device 21, and the vibration occurring in the dump truck 2. The state quantity of the dump truck 2 detected by the state quantity sensor 320 may include at least one of a hydraulic pressure of the hydraulic circuit of the dump truck 2, the stress applied to the dump truck 2, and the acceleration of the traveling device 21.

The acquisition device 300 may include a sound collecting device. A sound collecting device such as a microphone may be provided in the cab 26 so as to collect the voice of a driver, an alarm sound generated by an alarm device (not illustrated), and the like. Moreover, the sound collecting device may be provided near the driving device 24, for example, so as to collect a drive sound generated by a diesel engine or the like. That is, the operating state data may include sound data.

(Remote Diagnosis System)

Figure 5:
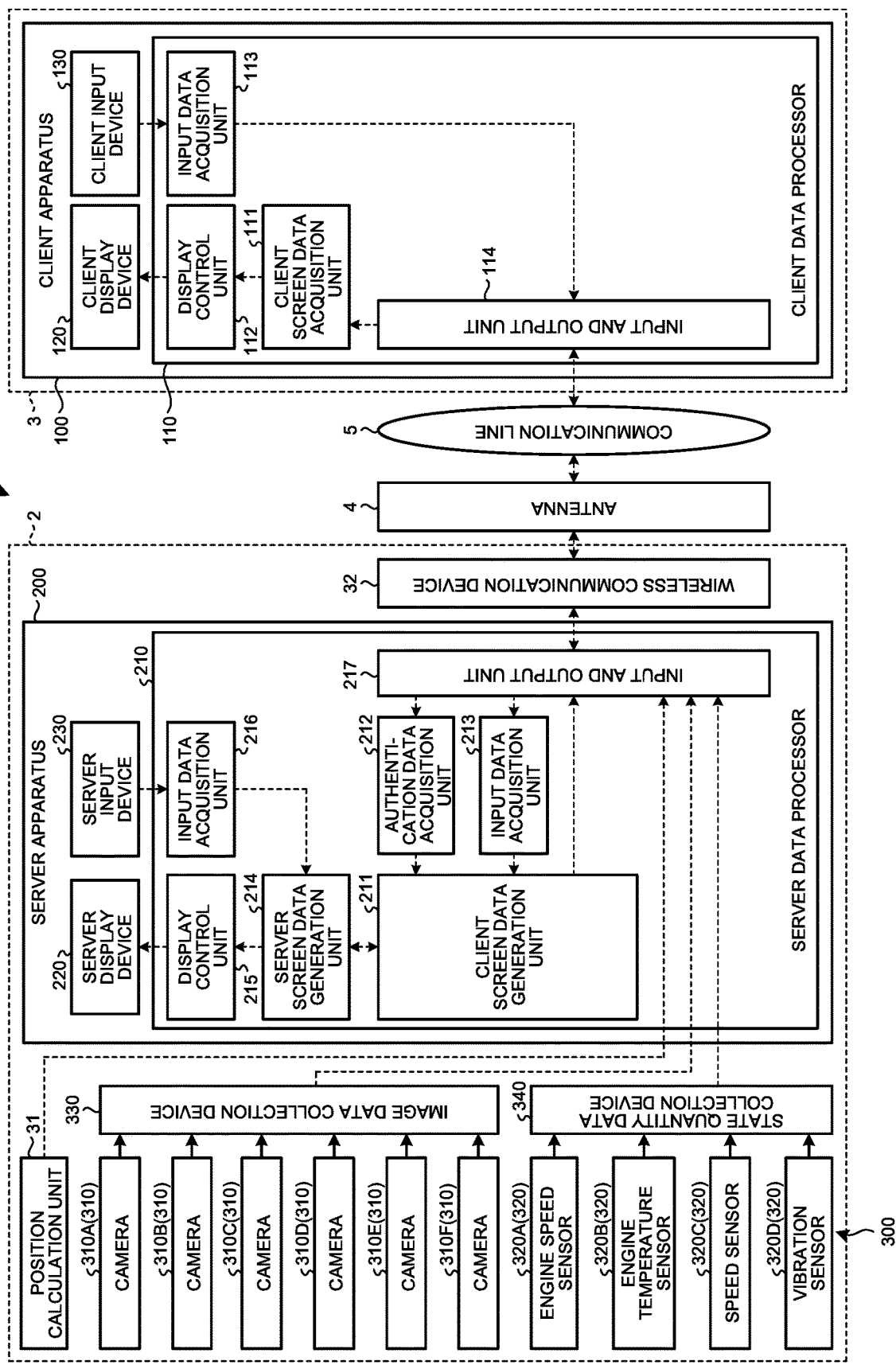
FIG. 5 is a functional block diagram illustrating an example of a remote diagnosis system according to the first embodiment.

Next, the remote diagnosis system 1A will be described. FIG. 5 is a functional block diagram illustrating an example of the remote diagnosis system 1A according to the present embodiment. As illustrated in FIG. 5, the remote diagnosis system 1A includes the client apparatus 100, the server apparatus 200 that can communicate with the client apparatus 100 via the antenna 4 and the communication line 5, the position calculation unit 31 that calculates the absolute position of the dump truck 2, the wireless communication device 32 connected to the server apparatus 200, the acquisition device 300 that includes the camera 310 and the state quantity sensor 320, an image data collection device 330 that acquires the image data of the camera 310, and a state quantity data collection device 340 that acquires the state quantity data detected by the state quantity sensor 320.

The server apparatus 200 includes the server data processor 210, the server display device 220, and the server input device 230. The client apparatus 100 includes the client data processor 110, the client display device 120, and the client input device 130.

The server data processor 210 includes a client screen data generation unit 211 that generates client screen data that the client display device 120 of the client apparatus 100 can display based on the operating state data acquired by the acquisition device 300. The details of the client screen data will be described later. The server data processor 210 further includes an authentication data acquisition unit 212 that acquires authentication data of the client apparatus 100 from the client apparatus 100, an input data acquisition unit 213 that acquires input data generated by the client input device 130 from the client apparatus 100, a server screen data generation unit 214 that generates server screen data that the server display device 220 can display based on the operating state data acquired by the acquisition device 300, a display control unit 215 that causes the server display device 220 to display the server screen data, an input data acquisition unit 216 that acquires input data generated by the server input device 230, and an input and output unit 217. As described above, when the server display device 220 is not provided, the server data processor 210 may not include the server screen data generation unit 214 and the display control unit 215.

The client data processor 110 includes a client screen data acquisition unit 111 that acquires the client screen data generated by the client screen data generation unit 211 from the server apparatus 200, a display control unit 112 that causes the client display device 120 to display the client screen data, an input data acquisition unit 113 that acquires the input data generated by the client input device 130, and an input and output unit 114.

The client screen data generation unit 211 generates client screen data based on the operating state data acquired by the acquisition device 300. The operating state data includes the image data acquired by the camera 310 and the state quantity data acquired by the state quantity sensor 320. The client screen data is screen data that the client display device 120 can display. The state quantity data acquired by the state quantity sensor 320 includes a waveform image which is based on the state quantity data acquired by the state quantity sensor 320. Thus, the client screen data displayed on the client display device 120 includes the image data acquired by the camera 310, the state quantity data acquired by the state quantity sensor 320, map data indicating an area on which the dump truck 2 travels, and position data indicating the absolute position of the dump truck 2 acquired by the position calculation unit 31. The details of the map data and the position data will be described later. Moreover, the client screen data displayed on the client display device 120 may include the waveform image only based on the state quantity data acquired by the state quantity sensor 320. Alternatively, the client screen data displayed on the client display device 120 may include the waveform image which is based on the state quantity data acquired by the state quantity sensor 320 and the position data indicating the absolute position of the dump truck 2 acquired by the position calculation unit 31.

The client screen data generation unit 211 generates client screen data based on the characteristic data of the client display device 120. The characteristic data of the client display device 120 is transmitted from the client apparatus 100 to the server apparatus 200 via the communication line 5 and the antenna 4. The client screen data generation unit 211 acquires the characteristic data of the client display device 120 via the wireless communication device 32 and the input and output unit 217. The characteristic data of the client display device 120 includes display format data indicating a display format that the client display device 120 can display. The display format data of the client display device 120 includes at least one of a screen size, a resolution, and the number of colors of the client display device 120.

The authentication data acquisition unit 212 acquires authentication data of the client apparatus 100 from the client apparatus 100. The authentication data includes a password input by the client input device 130, for example. The authentication data acquisition unit 212 determines whether the client apparatus 100 is given an access right based on the authentication data supplied from the client apparatus 100. Upon receiving an access request from the client apparatus 100, the authentication data acquisition unit 212 determines whether an access is permitted based on the authentication data. The authentication data of the client apparatus 100 is transmitted from the client apparatus 100 to the server apparatus 200 via the communication line 5 and the antenna 4. The authentication data acquisition unit 212 acquires the authentication data of the client apparatus 100 via the wireless communication device 32 and the input and output unit 217.

The wireless communication device 32 transmits the client screen data generated by the client screen data generation unit 211 to the client apparatus 100 based on the authentication data. The client screen data is transmitted to the client apparatus 100 of which the access is permitted by the authentication data acquisition unit 212. The client screen data is not transmitted to the client apparatus 100 of which the access is not permitted by the authentication data acquisition unit 212. The client screen data transmitted to the client apparatus 100 includes the image data acquired by the camera 310 and the state quantity data acquired by the state quantity sensor 320.

The wireless communication device 32 may transmit the raw data of the state quantity data and audio data and position data which will be described later to the client apparatus 100 together with the client screen data. Moreover, the wireless communication device 32 may transmit the waveform image only based on the state quantity data acquired by the state quantity sensor 320 within the client screen data to the client apparatus 100 as the client screen data.

The input data acquisition unit 213 receives the input data generated by the client input device 130 of the client apparatus 100. The input data includes control data for editing or controlling the client screen data. Moreover, the input data includes operation data for remotely operating the server apparatus 200. The input data generated when the client input device 130 is operated is transmitted from the client apparatus 100 to the server apparatus 200 via the communication line 5 and the antenna 4. The wireless communication device 32 receives the input data generated by the client input device 130 of the client apparatus 100. The input data acquisition unit 213 acquires the input data generated by the client input device 130 via the wireless communication device 32 and the input and output unit 217.

As described above, the client apparatus 100 can remotely access the server apparatus 200 via the antenna 4 and the communication line 5. An administrator can remotely operate the server apparatus 200 by operating the client input device 130 of the client apparatus 100. The client screen data generation unit 211 edits the client screen data based on the input data generated by the client input device 130. That is, the administrator can edit the client screen data displayed on the client display device 120 by remotely accessing the server apparatus 200.

The server screen data generation unit 214 generates server screen data based on the operating state data acquired by the acquisition device 300. The server screen data is screen data that the server display device 220 can display. The server screen data generation unit 214 generates server screen data based on the characteristic data of the server display device 220. The characteristic data of the server display device 220 includes display format data indicating a display format that the server display device 220 can display. The display format data of the server display device 220 includes at least one of the screen size, the relation, and the number of colors of the server display device 220. In the present embodiment, the client screen data displayed on the client display device 120 is substantially the same as the server screen data displayed on the server display device 220.

The display control unit 215 controls the server display device 220 so that the server screen data generated by the server screen data generation unit 214 is displayed on the server display device 220.

The client screen data acquisition unit 111 acquires the client screen data generated by the client screen data generation unit 211 from the server apparatus 200 of the dump truck 2 via the antenna 4 and the communication line 5. Moreover, the client screen data acquisition unit 111 may acquire the position data indicating the absolute position of the dump truck 2 acquired by the position calculation unit 31 from the server apparatus 200 via the antenna 4 and the communication line 5. Here, when the acquisition device 300 includes a sound collecting device, an audio output device (not illustrated) of the client data processor 100 may acquire audio data acquired by the sound collecting device from the wireless communication device 32 via the antenna 4 and the communication line 5 and output sound based on the audio data.

The display control unit 112 controls the client display device 120 to cause the client display device 120 to display the client screen data generated by the client screen data generation unit 211.

(Remote Diagnosis Method)

Figure 6:
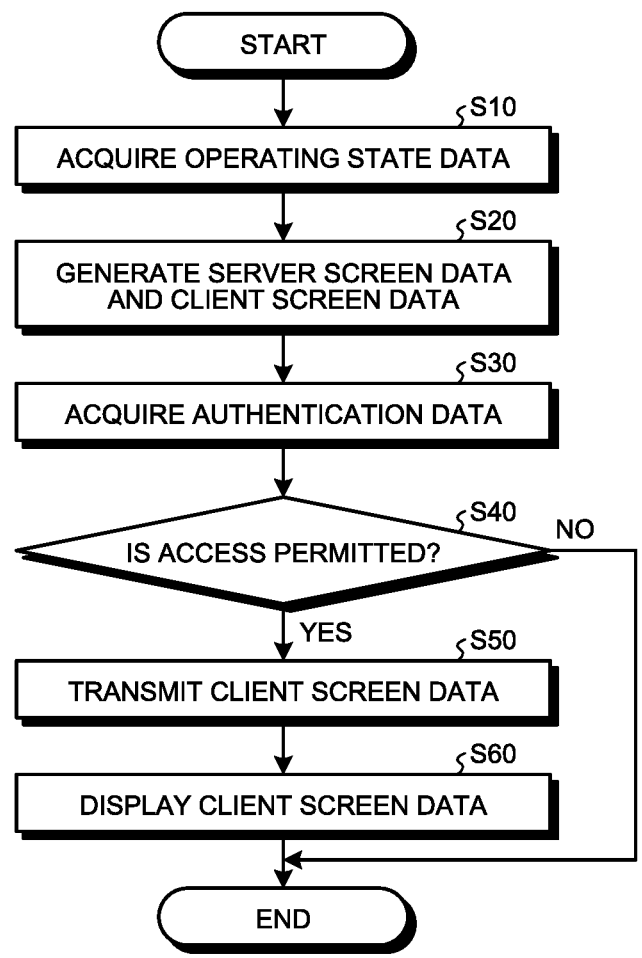
FIG. 6 is a flowchart illustrating an example of a remote diagnosis method according to the first embodiment.

Next, a remote diagnosis method according to the present embodiment will be described. FIG. 6 is a flowchart illustrating an example of a remote diagnosis method for the dump truck 2 according to the present embodiment.

The acquisition device 300 acquires the operating state data of the dump truck 2 (step S10). The acquisition device 300 monitors the operating state data in a prescribed monitoring period. The monitoring period includes an operating period in which the dump truck 2 operates. The operating period of the dump truck 2 includes an operating period in which the driving device 24 of the dump truck 2 operates. The operating period of the dump truck 2 includes a traveling period in which the driving device 24 operates and the traveling device 21 travels. The operating period of the dump truck 2 may be a period in which the driving device 24 operates and the traveling device 21 stops.

The operating state data of the dump truck 2 includes at least one of the image data around the dump truck 2 acquired by the camera 310 provided in the dump truck 2 and the image data of the inside of the dump truck 2. Moreover, the operating state data of the dump truck 2 includes the state quantity data of the dump truck 2 detected by the state quantity sensor 320 provided in the dump truck 2. The operating state data acquired by the acquisition device 300 including the camera 310 and the state quantity sensor 320 is output to the server apparatus 200. The acquisition device 300 continuously outputs the operating state data to the server apparatus 200 at a prescribed sampling cycle in the monitoring period. The sampling cycle of the operating state data output from the acquisition device 300 to the server apparatus 200 is between 0.1 seconds and 1.0 seconds, for example. The operating state data is time series data acquired in the monitoring period.

The server screen data generation unit 214 generates server screen data based on the operating state data. Moreover, the client screen data generation unit 211 generates client screen data based on the operating state data (step S20).

The server screen data generation unit 214 generates the server screen data from the operating state data acquired by the acquisition device 300 in real time. Similarly, the client screen data generation unit 211 generates the client screen data from the operating state data acquired by the acquisition device 300 in real time. In the present embodiment, the server screen data and the client screen data include video data.

The server apparatus 200 receives an access request from the client apparatus 100. The client apparatus 100 transmits authentication data to the server apparatus 200. The authentication data acquisition unit 212 acquires authentication data (step S30).

The authentication data acquisition unit 212 determines whether the client apparatus 100 is permitted to access based on the authentication data (step S40).

In step S40, when it is determined that the access is not permitted (step S40: No), the client screen data is not transmitted to the client apparatus 100, and the process ends.

In step S40, when it is determined that the access is permitted (step S40: Yes), the wireless communication device 32 transmits the client screen data from the server apparatus 200 of the dump truck 2 to the client apparatus 100 via the antenna 4 and the communication line 5 (step S50).

The wireless communication device 32 sequentially transmits the client screen data generated by the client screen data generation unit 211 to the client apparatus 100 at a prescribed sampling cycle. The sampling cycle of the client screen data transmitted from the server apparatus 200 to the client apparatus 100 is between 0.1 seconds and 10.0 seconds, for example. When the client screen data includes the waveform image which is based on the state quantity data acquired by the state quantity sensor 320 and the image data acquired by the camera 310, both are transmitted from the wireless communication device 32 to the client apparatus 100 via the antenna 4 and the communication line 5 in synchronization. That is, a variation in the physical quantity appearing in the waveform image and a state indicated by the image acquired by the camera 310 are transmitted to the client apparatus 100 in synchronization and both are displayed on the display screen of the client display device 120 as synchronized information.

The client screen data acquisition unit 111 of the client apparatus 100 acquires the client screen data from the server apparatus 200. The display control unit 112 causes the client display device 120 of the client apparatus 100 to display the client screen data (step S60). The display control unit 112 causes the client display device 120 to display the client screen data transmitted from the server apparatus 200 in real time. The client screen data displayed on the client display device 120 includes video data.

(Client Display Device)

Figure 7:
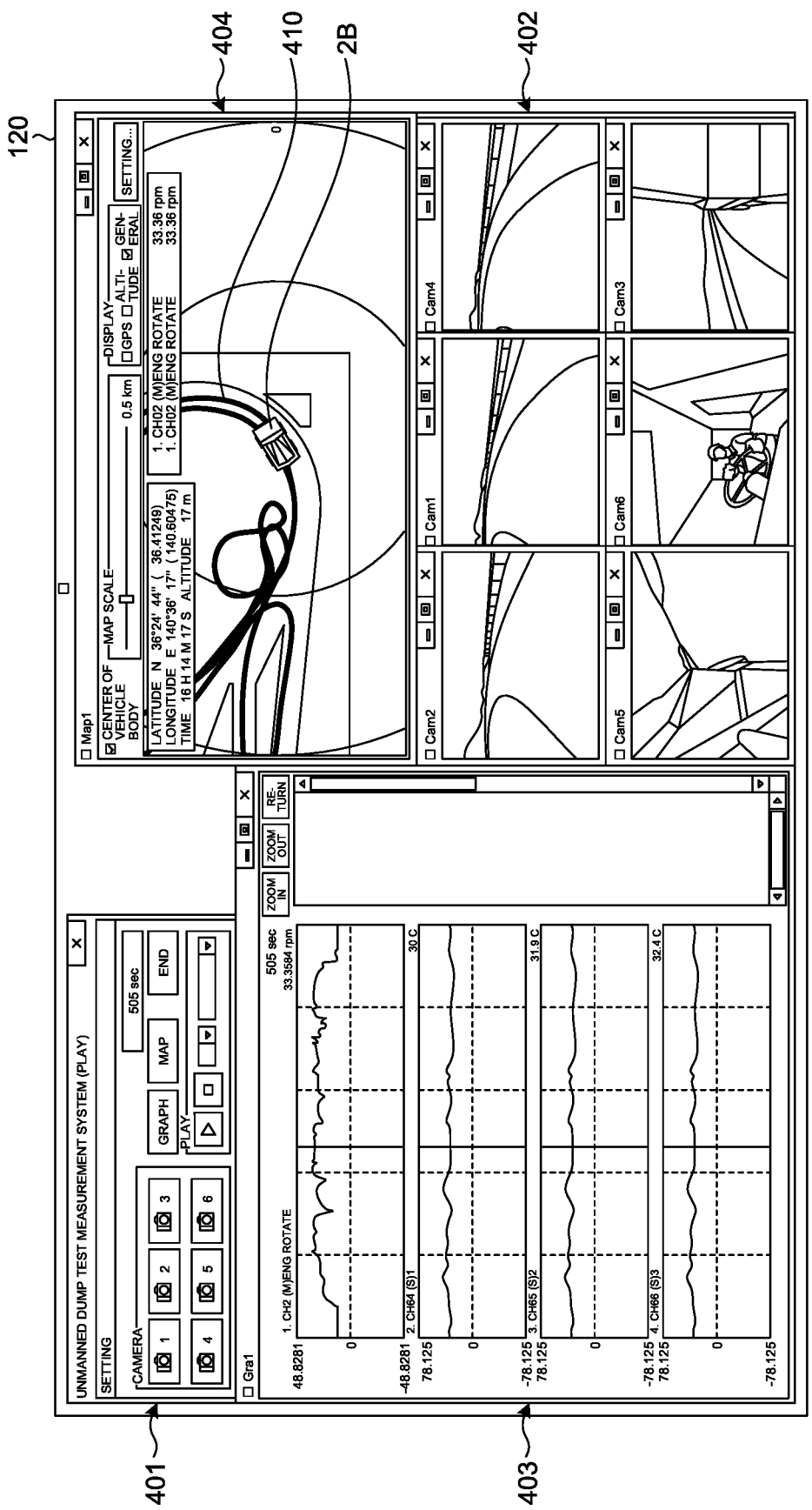
FIG. 7 is a diagram illustrating an example of client screen data displayed on a client display device according to the first embodiment.

FIG. 7 is a diagram illustrating an example of client screen data displayed on the display screen of the client display device 120 according to the present embodiment. Icons for editing the setting of six cameras 310 or the image data acquired by the six cameras 310 are displayed in a first region 401 of the display screen of the client display device 120. The client screen data displayed on the client display device 120 may be waveform data only of the state quantity based on the state quantity data acquired by a plurality of state quantity sensors 320, displayed in a third region 403.

Moreover, the image data acquired by the six cameras 310 is displayed in a second region 402 of the display screen of the client display device 120. In FIG. 7, "Cam1" indicates image data acquired by the first camera 310A, "Cam2" indicates image data acquired by the second camera 310B, "Cam3" indicates image data acquired by the third camera 310C, "Cam4" indicates image data acquired by the fourth camera 310D, "Cam5" indicates image data acquired by the fifth camera 310E, and "Cam6" indicates image data acquired by the sixth camera 310F. As described above, the camera 310 has a video camera function capable of acquiring video data. The client screen data includes the video data acquired by the camera 310. The video data acquired by the camera 310 is displayed on the client display device 120 in real time.

Moreover, the state quantity data acquired by the plurality of state quantity sensors 320 is displayed in a third region 403 of the display screen of the client display device 120. In the present embodiment, the state quantity data acquired by the state quantity sensor 320 is displayed on the client display device 120 as waveform data. The horizontal axis of the graph is time and the vertical axis is a state quantity. The state quantity of the dump truck 2 acquired by the state quantity sensor 320 in a monitoring period changes from time to time. The state quantity data collection device 340 has a log function of recording and storing the state quantity data detected by the state quantity sensor 320 in a time-series order. The client screen data includes the video data indicating the time-varying state quantity acquired by the state quantity sensor 320. The video data indicating the time-varying state quantity acquired by the state quantity sensor 320 is displayed on the client display device 120 in real time. In the example illustrated in FIG. 7, the waveform image which is based on the operating state data is video data.

Moreover, the map data indicating an area on which the dump truck 2 travels and the position data indicating the absolute position of the dump truck 2 acquired by the position calculation unit 31 are displayed in a fourth region 404 of the display screen of the client display device 120. The map data is graphic data or picture data stored in a storage unit of the client data processor 100 in advance. The map data can be created based on picture data such as aerial photographs and satellite photographs or drawing data created by CAD or the like. When the dump truck 2 is traveling, the position data of the dump truck 2 acquired by the position calculation unit 310 changes from time to time. In the present embodiment, the position data is sequentially acquired with movement of the dump truck 2, and the display control unit 110 displays an icon 2B indicating the present position of the dump truck 2 on the map data displayed on the display screen of the client display device 120 based on the position data. The client screen data includes the video data indicating the time-varying position of the dump truck 2, acquired by the position calculation unit 31. As illustrated in the fourth region 404 of FIG. 7, the video data indicating the time-varying position of the dump truck 2 acquired by the position calculation unit 31 is displayed on the client display device 120 in real time.

Numerical data indicating latitude and longitude is displayed in the fourth region 404 as the position data of the dump truck 2. Moreover, numerical data indicating an engine speed is also displayed as the state quantity data of the dump truck 2. Furthermore, a travel trajectory 410 of the dump truck 2 is displayed in different colors. That is, the client data processor 100 acquires the state quantity data from the wireless communication device 32 of the server apparatus 200 via the antenna 4 and the communication line 5 separately from the client screen data and correlates the state quantity data with the position data. In this way, the travel trajectory can be displayed in a red color when the vehicle has traveled at a high engine speed and can be displayed in a green color when the vehicle has traveled at a low engine speed, for example.

As described above, an administrator who can operate the client apparatus 100 can remotely access the server apparatus 200. The administrator can remotely operate the client screen data generation unit 211 of the server apparatus 200 and edit the client screen data displayed on the client display device 120 by operating an icon displayed on the client display device 120, for example, with the aid of the client input device 130.

The administrator can control the video data of the camera 310 displayed on the client display device 120 by operating the icon in the first region 401, for example. For example, the administrator can temporarily stop the video data of the camera 310A and switch the video data displayed. When the icon in the first region 401 is operated, the input data generated by the operation is transmitted to the server apparatus 200 via the communication line 5. The client screen data generation unit 211 of the server apparatus 200 controls the client screen data based on the input data supplied from the client apparatus 100. The controlled client screen data is transmitted to the client apparatus 100 via the communication line 5. In this way, the client display device 120 can display the client screen data which corresponds to the intention of the administrator.

An icon for changing the scale (map scale) of the map data is displayed in the fourth region 404. The administrator can change the scale of the map data by operating the icon with the aid of the client input device 130.

(Operations and Effects)

As described above, according to the present embodiment, the operating state data of the dump truck 2 is acquired, the client screen data that the client display device 120 of the client apparatus 100 can display based on the operating state data is generated in the server apparatus 200, and the client screen data generated by the server apparatus 200 is wirelessly transmitted to the client apparatus 100. The data volume (hereinafter referred to as a volume) of the client screen data is smaller than the volume of the image data acquired by the camera 310 and the volume of the state quantity data acquired by the state quantity sensor 320, for example. That is, the volume of the operating state data (raw data) acquired by the acquisition device 300 is large whereas the volume of the client screen data generated by the client screen data generation unit 211 is small. For example, the volume of the operating state data (raw data) acquired by the state quantity sensor 320 is large whereas the volume of the client screen data (the waveform image which is based on the state quantity data which is the video data as illustrated in the third region 403 of FIG. 7) generated based on the raw data is small. When the operating state data having a large volume is transmitted from the server apparatus 200 to the client apparatus 100 as it is, the possibility that delay and interruption of communication may occur increases. According to the present embodiment, the client screen data generation unit 211 continuously generates client screen data having a smaller volume than the operating state data from the operating state data (raw data) having a large volume. The client screen data having the small volume is continuously transmitted from the server apparatus 200 to the client apparatus 100. That is, in the present embodiment, the client screen data is sequentially created from the raw data, and the created client screen data is sequentially transmitted from the server apparatus 200 to the client apparatus 100. Due to this, the client screen data is transmitted from the server apparatus 200 to the client apparatus 100 in a state in which delay and interruption of communication is suppressed, and at least the waveform data of the state quantity included in the client screen data is displayed on the display screen of the client display device 120 as illustrated in FIG. 7. As a result, the administrator can understand the operating state of the dump truck 2 by seeing the waveform of the state quantity data as illustrated in the third region 403, included in the client screen data, for example. For example, if the waveform of the state quantity data is different from that of a normal state, it can be determined that the operating state of the dump truck 2 is abnormal. Therefore, the administrator present at a remote site can reliably and smoothly check the operating state of the dump truck 2 via the client screen data without impairing a real-time property.

As described in the present embodiment, for example, as in FIG. 7, since the image data acquired by the cameras 310, the waveform data of the state quantity, the map data indicating an area on which the dump truck 2 travels, and the position data indicating the absolute position of the dump truck 2 acquired by the position calculation unit 31 are displayed simultaneously on the single display screen of the client display device 120, it is possible to smoothly and reliably check the operating state of the dump truck 2. The traveling position of the dump truck 2 can be checked from the map data and the position data, and the state of the traveling area can be checked from the image data acquired by the cameras 310. Moreover, the operating state of the dump truck 2 can be checked from the waveform data of the state quantity. That is, according to the present embodiment, three items of information including the physical quantity state such as an engine speed, the traveling position of the dump truck 2, and the state of the traveling area, indicating the operating state of the dump truck 2 are correlated, and the operating state of the dump truck 2 can be monitored. For example, when an abrupt change in the engine speed can be checked from the waveform data of the state quantity, the causes thereof can be analyzed from the road state of the traveling area of the dump truck 2 and the traveling position.

Moreover, the client screen data includes information necessary and sufficient for checking the operating state of the dump truck 2. Due to this, the client apparatus 100 at the remote site can analyze the operating state of the dump truck 2. Furthermore, diagnosis and prediction of failures in the dump truck 2, maintenance planning of the dump truck 2, and the like can be performed based on the analysis result of the operating state of the dump truck 2. Furthermore, it is possible to evaluate the operation or use conditions of the dump truck 2 based on the analysis result of the operating state of the dump truck 2 and to take measures for optimizing the operation or use conditions to improve fuel efficiency, for example.

In the present embodiment, the operating state data (raw data) of the dump truck 2 and the position data (raw data) of the dump truck 2 calculated by the position calculation unit 31 are transmitted from the server apparatus 200 to the client apparatus 100 in real time. Although there is a possibility of communication delay in transmission of the operating state data and the position data, since the operating state data and the position data are transmitted from the server apparatus 200 to the client apparatus 100, the client apparatus 100 can analyze the operating state of the dump truck 2 in more detail based on the operating state data and the position data.

In the present embodiment, the server apparatus 200 includes the authentication data acquisition unit 212 that acquires the authentication data of the client apparatus 100. Therefore, the server apparatus 200 can transmit the client screen data to the client apparatus 100 having an access right only.

In the present embodiment, it is possible to operate the graphical user interface (GUI) of the server apparatus 200 from the client apparatus 100 using a remote desktop technique. The input data generated when an administrator operates the client input device 130 of the client apparatus 100 is wirelessly transmitted to the server apparatus 200.

The client screen data generation unit 211 of the server apparatus 200 edits the client screen data based on the input data. In this way, the client apparatus 100 can remotely access the server apparatus 200 to edit the client screen data.

In the present embodiment, the client screen data includes the video data, and the display control unit 112 of the client apparatus 100 causes the client display device 120 to display the image data and the waveform data which is the time-series data acquired by the acquisition device 300 in real time as the video data. Therefore, an administrator at a remote site can smoothly check the operating state of the dump truck 2 in real time.

In the present embodiment, the vibration sensor 320D that detects a vibration occurring in the dump truck 2 as the state quantity sensor 320 is provided. Due to this, the display control unit 112 can display both the video data of a road surface on which the dump truck 2 travels, acquired by the camera 310 and the waveform data of a vibration occurring in the dump truck 2, acquired by the vibration sensor 320D on the display screen of the client display device 120 by the client screen data. In this way, an administrator can determine whether the cause of the vibration occurring in the dump truck 2 is attributable to the influence of a road surface or an abnormality in the dump truck 2 by seeing the display screen of the client display device 120.

In the present embodiment, server screen data is generated from the operating state data. Therefore, a driver boarding on the dump truck 2 as well as an administrator at a remote site can smoothly check the operating state of the dump truck 2 in real time.

In the present embodiment, the server apparatus 200 and the client apparatus 100 wirelessly communicate with each other via the portable antenna 4. When the dump truck 2 operates in a mine, a travel route of the dump truck 2 changes everyday. Due to this, an optimal position in which the antenna 4 is set in order for the management facility 3 and the dump truck 2 to perform wireless communication changes everyday. According to the present embodiment, since the antenna 4 is portable, it is possible to easily install a plurality of antennas 4 at optimal positions by taking a wireless communication state and a place (unevenness and a slope of a ground surface) in which the antenna 4 can be installed stably into consideration based on the changing travel route of the dump truck 2.

Second Embodiment

A second embodiment will be described. In the following description, the same or equivalent portions as those of the above-described embodiment will be denoted by the same reference numerals, and description thereof will be simplified or omitted.

Figure 8:
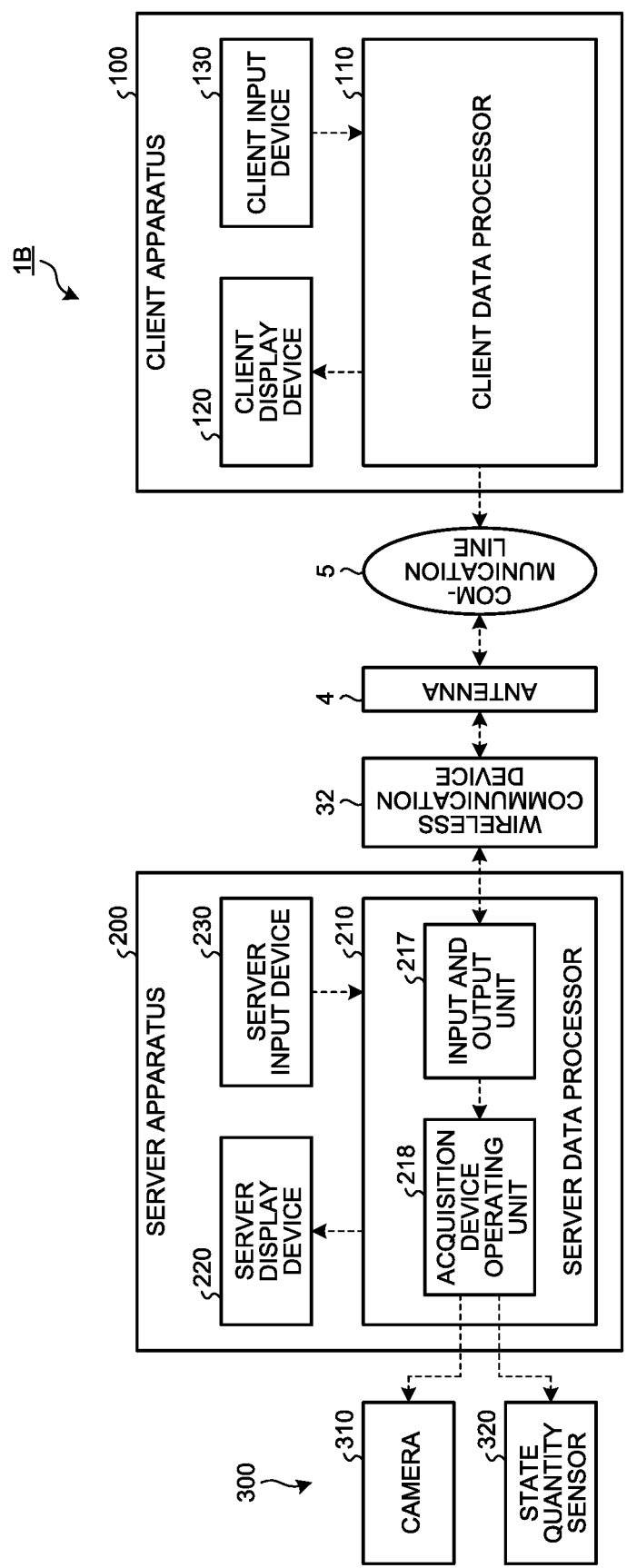
FIG. 8 is a functional block diagram illustrating an example of a remote diagnosis system according to a second embodiment.

FIG. 8 is a functional block diagram illustrating an example of a remote diagnosis system 1B according to the present embodiment. As illustrated in FIG. 8, in the present embodiment, the server data processor 210 includes an acquisition device operating unit 218 that generates an operation signal for operating the acquisition device 300 based on the input data generated by the client input device 130 of the client apparatus 100.

In the present embodiment, an administrator remotely operates the acquisition device 300 via the server apparatus 200 by operating the client input device 130 of the client apparatus 100. The administrator can operate a zoom mechanism of an optical system of the camera 310, change the direction of the camera 310, and calibrate the state quantity sensor 320 by operating the client input device 130. When the client input device 130 is operated, the acquisition device operating unit 218 generates an operation signal for moving the acquisition device 300 based on the input data and outputs the operation signal to the acquisition device 300. The acquisition device operating unit 218 can output an operation signal for driving a zoom mechanism of the camera 310 and output an operation signal for driving an actuator capable of changing the direction of the camera 310 based on the input data.

As described above, in the present embodiment, the server apparatus 200 includes the acquisition device operating unit 218 that generates an operation signal for operating the acquisition device 300 based on the input data generated by the client input device 130 of the client apparatus 100. Therefore, an administrator can remotely operate the acquisition device 300 by operating the client input device 130. In the present embodiment, the administrator at a remote site can smoothly and reliably check the operating state of the dump truck 2 in real time.

Third Embodiment

A third embodiment will be described. In the following description, the same or equivalent portions as those of the above-described embodiments will be denoted by the same reference numerals, and description thereof will be simplified or omitted.

Figure 9:
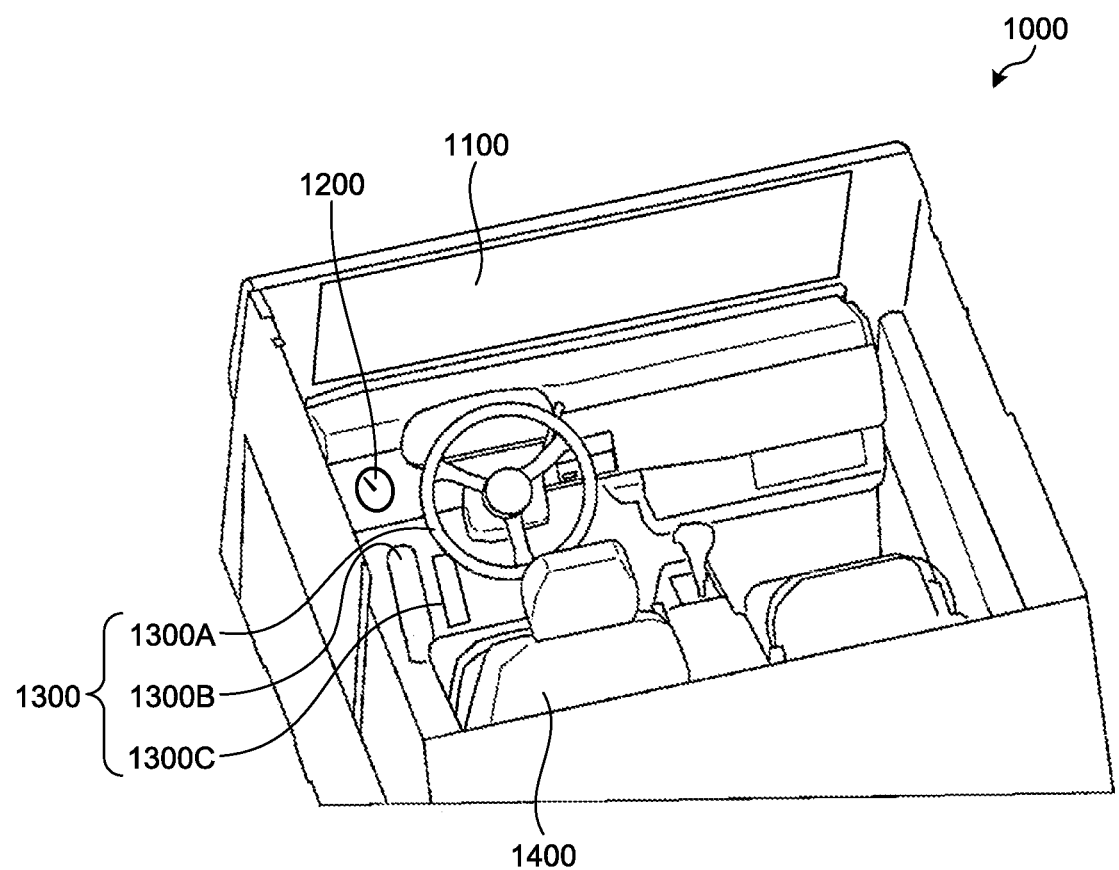
FIG. 9 is a diagram schematically illustrating an example of a remote diagnosis system according to a third embodiment.

In the above-described embodiments, it is assumed that a driver boards on the cab 26 to operate the dump truck 2. The dump truck 2 may be remotely operated. FIG. 9 is a diagram for describing an example of a remote control method for the dump truck 2.

FIG. 9 is a diagram illustrating a method in which the dump truck 2 is remotely operated from a remote control room 1000. The remote control room 1000 and the dump truck 2 can wirelessly communicate via a communication device. As illustrated in FIG. 9, a camera image display device 1100 on which the image data on a front side of the dump truck 2 acquired by the camera 310 is displayed, a client display device 1200, an operating device 1300 that remotely operates the dump truck 2, and a driver's seat 1400 are provided in the remote control room 1000. The operating device 1300 includes a steering wheel 1300A for remotely operating a steering device of the dump truck 2, an accelerator pedal 1300B for remotely controlling the output of the driving device 24 of the dump truck 2, and a brake pedal 1300C for remotely operating a brake device of the dump truck 2.

The client display device 1200 displays the client screen data generated by the client screen data generation unit 211 of the server apparatus 200 of the dump truck 2 based on the traveling speed data of the dump truck 2 detected by the speed sensor 320C. That is, in the present embodiment, the client screen data generation unit 211 of the dump truck 2 generates the client screen data indicating a traveling speed based on the traveling speed data detected by the speed sensor 320C. The client screen data is time-series data indicating the traveling speed and is video data indicating the traveling speed of the dump truck 2, which changes from time to time. The client screen data generation unit 211 continuously generates a traveling speed meter which is the video data as the client screen data. The client screen data generated by the client screen data generation unit 211 of the dump truck 2 is continuously transmitted to the remote control room 1000. The client display device 1200 of the remote control room 100 displays the client screen data transmitted from the dump truck 2.

As described above, the client screen data displayed on the client display device 1200 is an example. The client screen data is not limited to a traveling speed meter but may be an image which shows a change in the traveling speed as a waveform. Moreover, a target of the client screen data may be another physical quantity, and for example, may be video data (time-series data) indicating a residual fuel meter of the dump truck 2 and may be video data (time-series data) indicating an engine temperature meter. According to the present embodiment, it is possible to effectively check the operating state of the dump truck 2 which is remote-operated and diagnose and prediction of failures therein at a remote site.

Fourth Embodiment

A fourth embodiment will be described. In the following description, the same or equivalent portions as those of the above-described embodiments will be denoted by the same reference numerals, and description thereof will be simplified or omitted.

Figure 10:
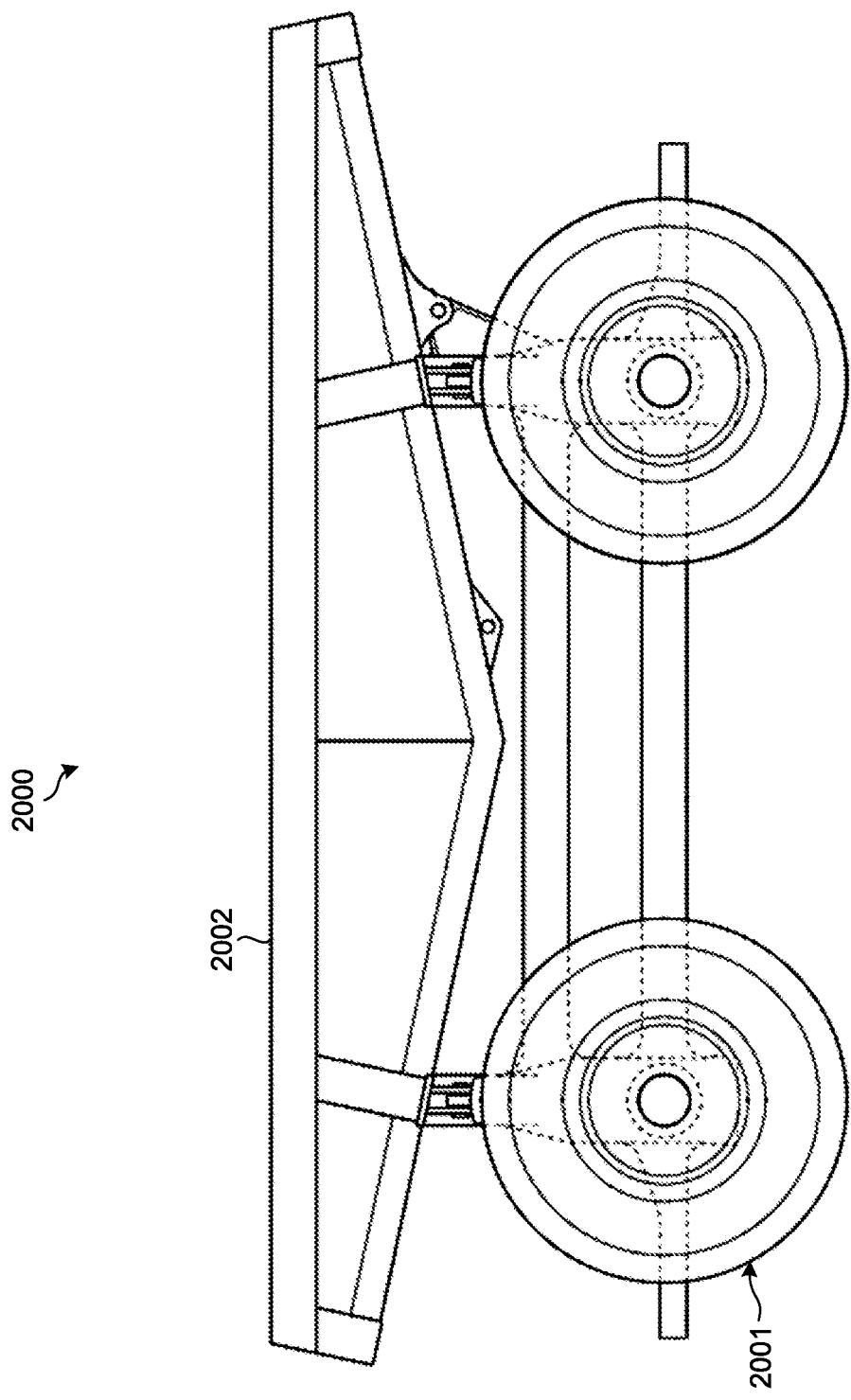
FIG. 10 is a side view schematically illustrating an example of a working vehicle according to a fourth embodiment.

FIG. 10 is a diagram schematically illustrating an example of a working vehicle 2000 according to the present embodiment. In the above-described embodiments, it is assumed that the working vehicle 2 is a manned delivery vehicle that travels with an operation of a driver. The working vehicle 2 may be an unmanned delivery vehicle that travels without the operation of a driver. As illustrated in FIG. 10, the working vehicle 2000 includes a traveling device 2001 and a dump body 2002 that is supported on the traveling device 2001. A cab is not present in the working vehicle 2000. The working vehicle 2000 travels or stops based on an instruction signal supplied wirelessly from a management facility. The working vehicle 2000 may autonomously travel based on detection results of a plurality of sensors mounted on the working vehicle 2000.

According to the present embodiment, it is possible to monitor the operating state of the working vehicle 2000 which is an unmanned delivery vehicle at a remote site. Due to this, diagnosis and prediction of failures in the working vehicle 2000, maintenance planning of the working vehicle 2000, and the like can be performed effectively.

In the above-described embodiments, it is assumed that the working vehicle 2 is a delivery vehicle. The working vehicle may be an excavator, a bulldozer, a wheel loader, or a forklift.

The configurations illustrated in the above-described embodiments illustrate an example of the content of the present invention and can be combined with other known techniques, and some of the configurations can be omitted and changed without departing from the spirit of the present invention.

REFERENCE SIGNS LIST

1A REMOTE DIAGNOSIS SYSTEM
1B REMOTE DIAGNOSIS SYSTEM
2 DUMP TRUCK (WORKING VEHICLE)
3 MANAGEMENT FACILITY
4 ANTENNA
5 COMMUNICATION LINE
21 TRAVELING DEVICE
22 VEHICLE BODY
23 VESSEL
24 DRIVING DEVICE
25 CONTROL DEVICE
26 CAB

27 STEERING WHEEL
31 POSITION CALCULATION UNIT
31A ANTENNA
32 WIRELESS COMMUNICATION DEVICE
32A ANTENNA
100 CLIENT APPARATUS
110 CLIENT DATA PROCESSOR
111 CLIENT SCREEN DATA ACQUISITION UNIT
112 DISPLAY CONTROL UNIT
113 INPUT DATA ACQUISITION UNIT
114 INPUT AND OUTPUT UNIT
120 CLIENT DISPLAY DEVICE
130 CLIENT INPUT DEVICE
200 SERVER APPARATUS
210 SERVER DATA PROCESSOR
211 CLIENT SCREEN DATA GENERATION UNIT
212 AUTHENTICATION DATA ACQUISITION UNIT
213 INPUT DATA ACQUISITION UNIT
214 SERVER SCREEN DATA ACQUISITION UNIT
215 DISPLAY CONTROL UNIT
216 INPUT DATA ACQUISITION UNIT
217 INPUT AND OUTPUT UNIT
218 ACQUISITION DEVICE OPERATING UNIT
220 SERVER DISPLAY DEVICE
220 SERVER INPUT DEVICE
300 ACQUISITION DEVICE
310 CAMERA
310A CAMERA
310B CAMERA
310C CAMERA
310D CAMERA
310E CAMERA
310F CAMERA
312 MONITOR DEVICE
312A MONITOR DEVICE
312B MONITOR DEVICE
312C MONITOR DEVICE
312D MONITOR DEVICE
312E MONITOR DEVICE
312F MONITOR DEVICE
320 STATE QUANTITY SENSOR
320A ENGINE SPEED SENSOR
320B ENGINE TEMPERATURE SENSOR
320C SPEED SENSOR
320D VIBRATION SENSOR
330 IMAGE DATA COLLECTION DEVICE
340 STATE QUANTITY DATA COLLECTION DEVICE
401 FIRST REGION
402 SECOND REGION
403 THIRD REGION
404 FOURTH REGION
410 TRAVEL TRAJECTORY
1000 REMOTE CONTROL ROOM
1100 CAMERA IMAGE DISPLAY DEVICE
1200 CLIENT DISPLAY DEVICE
1200 OPERATING DEVICE
1300A STEERING WHEEL
1300B ACCELERATOR PEDAL
1300C BRAKE PEDAL
1400 DRIVER'S SEAT
2000 UNMANNED DELIVERY VEHICLE
2001 TRAVELING DEVICE
2002 DUMP BODY

The invention claimed is:

1. A working vehicle comprising:
an acquisition device that acquires operating state data of the working vehicle in real time;
a client screen data generation unit that sequentially generates client screen data that a client display device of a client apparatus can display based on the operating state data, a data volume of the client screen data being smaller than the operating state data from which the client screen data is generated, the client screen data including at least a waveform image which is based on the operating state data; and
a wireless communication device that sequentially transmits the client screen data to the client apparatus for display in real time on the client display device.

2. The working vehicle according to claim 1, wherein the acquisition device includes a state quantity sensor.

3. The working vehicle according to claim 1, wherein the client screen data is a waveform image which is based on the operating state data.

4. The working vehicle according to claim 1, wherein the acquisition device includes a camera.

5. The working vehicle according to claim 1, wherein the acquisition device includes a position calculation unit.

6. The working vehicle according to claim 1, wherein the client screen data generation unit generates client screen data based on characteristic data of the client display device.

7. The working vehicle according to claim 6, wherein the characteristic data includes display format data indicating a display format that is displayable by the client display device including one of a screen size, a resolution, or a number of colors of the client display device.

8. A remote diagnosis system comprising:
a client screen data acquisition unit that acquires client screen data sequentially generated based on real time operating state data of a working vehicle from a server apparatus of the working vehicle via a communication line, a data volume of the client screen data being smaller than the operating state data from which the client screen data is generated, the client screen data from the server apparatus including at least a waveform image which is based on the operating state data; and
a display control unit that causes a client display device of a client apparatus to display in real time the client screen data.

9. The remote diagnosis system according to claim 8, wherein
the operating state data includes state quantity data of the working vehicle, the state quantity data being detected by a state quantity sensor provided in the working vehicle.

10. The remote diagnosis system according to claim 8, wherein
the working vehicle is an unmanned delivery vehicle.

11. A remote diagnosis method comprising:
acquiring operating state data of a working vehicle in real time;
sequentially generating client screen data based on the operating state data, a data volume of the client screen data being smaller than the operating state data from which the client screen data is generated, the client screen data including at least a waveform image which is based on the operating state data;

sequentially transmitting the client screen data from a server apparatus of the working vehicle to a client apparatus via a communication line; and causing a client display device of the client apparatus to display in real time the client screen data.

\* \* \* \* \*